3,078,305
BOROXINE PREPARATION
Elmer H. Dobratz, Pittsburgh, Pa., assignor to Koppers
Company, Inc., a corporation of Delaware
No Drawing. Filed Dec. 15, 1960, Ser. No. 75,905
9 Claims. (Cl. 260—545)

This invention relates to a novel and improved method of making triorganoboroxines, (RBO)₃. In one specific aspect, it relates to a new reaction, involving a metal borate, a triorganoborane and a boron halide, by which the desired organobroxines can be made in a good yield.

The boroxines were prepared by Goubeau and Keller in 1951 by reacting a trialkylborane with anhydrous boric oxide in an autoclave at temperatures above 300° C. over a long period of time. The process of Goubeau was improved upon to some extent by Hennion et al., J. Am. Chem. Soc., 79, 5194 (1957), who found that various boroxines could be made by reacting triorganoboranes with anhydrous boric oxide under reflux conditions for a 24 to 120 hour period. The triorganoboroxines are important intermediates in the preparation of boronic acids, diorganoboranes and diborane. They are useful per se as additives to gasoline, wherein from 0.01 to 0.5% by weight of boroxine increases the octane rating of the gasoline. In concentrations of 0.1% to 1% by weight in hydrocarbons such as cyclohexane, the boroxines are effective herbicides. Certain derivatives of the boroxines are useful in improving the cetane number of diesel fuels according to the teachings of U.S. Patent No. 2,939,885.

Quite surprisingly, I have discovered a new method for making the desired triorganoboroxines which involves the use of metal borates, raw materials which are less expensive and more readily available in comparison with boric oxide. My new method has a further advantage over that reported by Hennion et al., in that the time required for the reaction is generally not more than about 5 hours in contrast with the 24 to 120 hours needed using the Hennion process.

It is therefore an object of the present invention to provide a new method for making triorganoboroxines which utilizes the relatively inexpensive metal borates and which is considerably more economical with respect to time than prior art techniques.

In accordance with the invention, triorganoboroxines are made by reacting in an inert atmosphere a boron halide and at least a stoichiometric quantity of a triorganoborane of the formula R₃B, wherein R is lower alkyl, alkaryl or aryl, and a metal borate of the formula

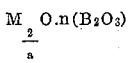

wherein M is an alkali or alkaline earth metal, $a$ is the valence of the metal, and $n$, representing the number of boron oxide molecules associated with the metal oxide, varies from 1 to 5. The reaction takes place at an elevated temperature and at pressures up to 2000 p.s.i., and there is recovered from the reaction mixture a triorganoboroxine of the formula (RBO)₃, wherein R corresponds to the R group of the triorganoborane reactant. The overall reaction is perhaps best understood by referring to the following equation, wherein R, M, $a$ and $n$ have the values given above and X is halogen:

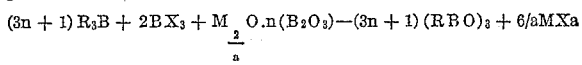

The basic starting materials for use in the invention are the metal borates and the triorganoboranes. Many of the metal borates occur naturally and others are synthesized on a commercial scale. Useful metal borates are the alkali and alkaline earth metal borates, including sodium tetraborate, sodium metaborate, potassium tetraborate, potassium metaborate, calcium metaborate, magnesium metaborate and the like. The naturally occurring borates are complex compounds wherein the number of molecules of boron oxide chemically associated with the metal oxide varies between about 1 and 5. Some of the triorganoboranes are available commercially and others are easily made by recently developed processes. For preparing the trialkylboranes, I prefer to use either of the methods described and claimed in my copending applications Serial Number 717,542 and Serial Number 780,649.

The reaction does not proceed in the absence of a boron halide, as is well shown by Example IV. Useful boron halides include boron trifluoride, boron trichloride, boron tribromide and boron triiodide, all of these materials being available in commercial quantities.

The reactants used should be essentially anhydrous, since the product boroxines are readily hydrolyzable in water. Under the conditions of the reaction, the triorganoboranes are also attacked by water; thus, the presence of any substantial quantity of water in the reaction mixture causes a considerable loss of yield. Boronic acids formed as a result of hydrolysis of a boroxine are useful as such or they can be dehydrated and thus converted back to the boroxine.

The use of an inert gas such as nitrogen, argon, helium or the like, is essential to my new method, since both the triorganoboranes and the triorganoboroxines are readily oxidized by air. It is preferable to purge the equipment to be used thoroughly with the inert gas before charging the reactants.

The mole ratio of the reactants is of particular importance. To prevent the formation of undesirable by-products, such as organoboron halides and organohaloboroxines, the boron halide should never be in excess of the stoichiometric requirement indicated by the foregoing equation. A slight excess of the metal borate is desirable, since it tends to prevent the formation of the undesirable halogenated compounds which interfere to a considerable extent with the recovery of the desired triorganoboroxine. The use of a considerable excess of metal borate is not harmful, although in such a case, it is necessary to provide for recovery of this reactant for reuse in subsequent preparations. An excess of the triorganoborane is desirable, since it tends to aid in driving the reaction to completion, thereby providing higher yields in a shorter period of time.

The reaction is conducted at an elevated temperature between about 150 to 350° C. While some reaction occurs slowly at temperatures below 150° C., the use of such temperatures would involve undesirably long reaction times. At temperatures above about 350° C., there is some danger of decomposing the reactants and products. A preferred temperature range is between 200° C. and 300° C.

The use of pressures slightly higher than atmospheric is required, because of the high volatility of the boron halides and trialkyl boranes. Thus, the minimum pressure used is that necessary to prevent escape of the reactants and to help promote intimate contact between them. Since the boron halide is generally the most volatile of the reactants, the amount of pressure used varies with the volatility of the halide. The upper limit on the amount of pressure applied is governed by practical rather than theoretical considerations, since it is obviously desirable to use the lowest effective pressures from the standpoint of the equipment cost. Pressures as high as 2000 p.s.i. can be used, although it is more convenient to use a pressure ranging between about 25 and 1000 p.s.i.

The triorganoborane conveniently serves as a suspension medium for the other reactants. If desired, anhydrous saturated hydrocarbon solvents can be used, their use being advantageous when the product boroxine (e.g., triphenylboroxine, M.P. 214–216) is a relatively high melting solid.

The reaction time varies with the nature of the reactants and the temperature and pressure conditions used. Generally, reaction is complete within a period of 1 to 8 hours, although a slightly longer time is required if a more sterically hindered triorganoborane is chosen as a reactant. After the reaction is complete, the solid coproducts are separated from the product boroxine by filtration or decantation. The boroxine is recovered from the liquid portion of the reaction mixture by fractional distillation or crystallization.

My invention is further illustrated by the following examples:

*Example I*

To a dry, nitrogen-purged, one-gallon autoclave was charged 1085 g. (11.07 moles) triethylborane, 672 g. (2.67 moles) boron tribromide and 825 g. (4.11 moles) of anhydrous sodium tetraborate. The autoclave was sealed. Over a period of 1.5 hours, it was heated to 250° C. and a pressure of 230 p.s.i. was developed. Within an hour, the pressure dropped to 205 p.s.i. where it remained constant. Heating at 250° C. was continued for an additional hour. The autoclave was then cooled and vented. Four grams of ethane was collected in a liquid-nitrogen cooled trap. A liquid sample, 225 g., was removed and fractionated. The recovery of triethylboroxine, B.P. 49° to 51°, was 76.8% of the weight of the sample, indicating a yield of about 79% of theory. The autoclave was again sealed and heated at 250° C. for an additional 5 hours. The maximum pressure developed was 145 p.s.i. and the final pressure 140 p.s.i. After cooling and venting, a liquid sample was removed. Upon fractionation the recovery of triethylboroxine was 87%, which indicated a yield of approximately 89% of theory.

*Example II*

To the autoclave was charged 1034 g. triethylborane, 856 g. sodium tetraborate and 316 g. boron trichloride. Over a period of 45 minutes, the sealed, agitated, autoclave was heated to 250° C. and was there maintained for 3.5 hours, during which time the pressure decreased from a maximum of 250 p.s.i. to 232 p.s.i. and remained constant. The autoclave was then cooled to 14° C. and 5.3 g. of an unidentified liquid was condensed from the exhaust gases. After the solids had settled, 1419 g. of liquid was discharged. A sample was fractionally distilled and shown to contain 36.5% of triethylboroxine. The yield of triethylboroxine was 30% of theory.

*Example III*

To the autoclave was charged 1137 g. triethylborane and 950 g. anhydrous sodium tetraborate. The sealed autoclave was heated to 170° C. where the developed pressure was 75 p.s.i. Over a period of 24 minutes, 213 g. of boron trifluoride was fed to the autoclave. A maximum pressure of 500 p.s.i. was developed and during the course of the addition the pressure dropped to 350 p.s.i. Over a period of 1.25 hours, the autoclave was heated to 250° C. where it was maintained for 1.25 hours, during which time the pressure fell from a maximum of 740 p.s.i. to 390 p.s.i. The temperature was then raised to 275° C. and in 35 minutes the pressure fell from 537 p.s.i. to 235 p.s.i. At this point a leak developed in the system, making it necessary to shut down. After cooling 21 g. of boron trifluoride was condensed from the exhaust gases. After permitting the solids to settle, 1087 g. of liquid was discharged from the autoclave. By fractional distillation, it was found to contain 54% of triethylboroxine.

*Example IV*

To the autoclave was charged 1170 g. triethylborane and 471 g. anhydrous sodium tetraborate. The sealed autoclave was heated to 250° C. where the developed pressure was 290 p.s.i. Heating at 250° C. was continued for 10.5 hours, wherein the pressure remained constant at 290 p.s.i. The autoclave was then cooled and vented. Upon distillation of a liquid sample (190 g.) only triethylborane, boiling at 93.5° C. at 743 mm., was obtained, indicating that no reaction had occurred.

*Example V*

To the autoclave was charged 1400 g. diethylcyclohexane, 300 g. triphenylborane, 85 g. boron tribromide and 107 g. anhydrous sodium tetraborate. The sealed, stirred autoclave was heated at 250° C. for 6 hours, during which time the pressure dropped from a maximum of 152 p.s.i. to 135 p.s.i. The autoclave was then cooled to 130° C. and vented. After the solids (primarily sodium bromide) had settled, the supernatant liquor was decanted into a purged 5-l. flask and was permitted to cool to room temperature. A white solid crystallized from the liquor. The solid was removed by filtration, washed with two 50-ml. portions of cyclohexane and was vacuum dried at 100° C. The weight of the dried solid was 290 g. It melted at 209° C. to 214° C. (Kuivila, J. Am. Chem. Soc., 74, 5,068–70 (1952) gives the melting point as 214° C. to 216° C.). After recrystallization of a sample from cyclohexane, it melted at 214° C. to 216° C. An intimate mixture of the recrystallized sample with triphenylboroxine prepared by the dehydration of phenylboronic acid, also melted at 214° C. to 216° C., thus establishing the identity of the product since there was no depression of the melting point.

I claim:

1. Method of making triorganoboroxines of the formula $$(RBO)_3$$

comprising reacting in an atmosphere inert to the reaction boron trihalide with at least stoichiometric quantities of a triorganoborane of the formula $$R_3B$$

wherein R is a member selected from the group consisting of lower alkyl, lower alkylphenyl and phenyl radicals, and a metal borate of the formula $$M_{\frac{2}{a}}O \cdot n(B_2O_3)$$

wherein M is a member selected from the group consisting of alkali and alkaline earth metals, $a$ is the valence of the metal and $n$ is a number having the value of 1 to 5, at an elevated temperature of from 150–350° C. and at a superatmospheric pressure of up to 2000 p.s.i., and recovering said triorganoboroxine from the reaction mixture.

2. Method of making triorganoboroxines of the formula $$(RBO)_3$$

comprising reacting in an atmosphere inert to the reaction boron trihalide with at least stoichiometric quantities of a triorganoborane of the formula $$R_3B$$

wherein R is a member selected from the group consisting of lower alkyl, lower alkylphenyl and phenyl radicals, and a metal borate of the formula $$M_{\frac{2}{a}}O \cdot n(B_2O_3)$$

wherein M is a member selected from the group consisting of alkali and alkaline earth metals, $a$ is the valence of the metal and $n$ is a number having the value of 1 to 5, at a temperature of 150° C. to 350° C., and at a pressure of 25 to 1000 p.s.i., and recovering said triorganoboroxine from the reaction mixture by fractional distillation.

3. Method of making tri lower alkyl boroxines comprising reacting in an atmosphere inert to the reaction boron tri-halide with at least stoichiometric quantities of a tri lower alkyl borane and an alkali metal tetraborate at an elevated temperature of from 150–350° C. and at a pressure sufficient to prevent the escape of volatile components from the reaction mixture, and recovering a tri lower alkyl boroxine from the reaction mixture.

4. Method of making tri lower alkyl boroxines comprising reacting in an atmosphere inert to the reaction a boron halide with at least stoichiometric quantities of a tri lower alkyl borane and an alkali metal tetraborate at a temperature of 150–350° C. and at a superatmospheric pressure up to 2000 p.s.i., and recovering a tri lower alkyl boroxine from the reaction mixture.

5. Method according to claim 4 wherein said alkali metal tetraborate is sodium tetraborate.

6. Method according to claim 4 wherein said boron trihalide is boron tribromide.

7. Method according to claim 4 wherein said boron trihalide is boron trichloride.

8. Method according to claim 4 wherein said boron trihalide is boron trifluoride.

9. Method of making tri lower alkyl boroxines comprising reacting in an atmosphere inert to the reaction boron trihalide with atl east stoichiometric quantities of a tri lower alkyl borane and sodium tetraborate at a temperature of 200–300° C. and a pressure of up to 1000 p.s.i., and recovering said tri lower alkyl boroxine from the reaction mixture by fractional distillation.

References Cited in the file of this patent

Goubeau et al.: Z. anorg. u. allgem. Chem., vol 267, pp. 1–26 (1951).

Goubeau et al.: Z. anorg. u. allgem. Chem., vol. 282, pp. 86–92 (1955).

Hennion et al.: J.A.C.S., vol. 79, pp. 5194–5196 (1957).